United States Patent
Cherouny

(10) Patent No.: US 7,042,347 B2
(45) Date of Patent: May 9, 2006

(54) ELECTRONIC PROGRAMMABLE SPEED LIMITER

(76) Inventor: Peter H. Cherouny, 43 Pheasant Way, So. Burlington, VT (US) 05403

( * ) Notice: Subject to any disclaimer, the term of this patent is extended or adjusted under 35 U.S.C. 154(b) by 0 days.

(21) Appl. No.: 11/235,350

(22) Filed: Sep. 26, 2005

(65) Prior Publication Data

US 2006/0052909 A1     Mar. 9, 2006

Related U.S. Application Data

(63) Continuation-in-part of application No. 09/695,443, filed on Jun. 19, 2001, now Pat. No. 6,970,075.

(51) Int. Cl.
*B60Q 1/00*     (2006.01)

(52) U.S. Cl. .................. 340/439; 340/438; 701/36; 701/93

(58) Field of Classification Search ............. 340/439, 340/438, 441, 573.1, 576; 701/36, 70, 93, 701/99
See application file for complete search history.

(56) References Cited

U.S. PATENT DOCUMENTS

| | | | |
|---|---|---|---|
| 4,098,242 A | | 7/1978 | Anderson |
| 4,341,985 A | | 7/1982 | Houskamp |
| 4,467,428 A | | 8/1984 | Caldwell |
| 4,495,913 A | | 1/1985 | Gray |
| 4,510,899 A | | 4/1985 | Macy |
| 4,559,912 A | | 12/1985 | Larom et al. |
| RE32,955 E | | 6/1989 | Macy |
| 5,096,015 A | | 3/1992 | Akishino et al. |
| 5,172,785 A | | 12/1992 | Takahashi |
| 5,319,352 A | | 6/1994 | Robertson et al. |
| 5,465,079 A | * | 11/1995 | Bouchard et al. ........... 340/576 |
| 5,549,089 A | | 8/1996 | Snell et al. |
| 5,819,198 A | * | 10/1998 | Peretz ....................... 701/117 |
| 6,198,996 B1 | * | 3/2001 | Berstis ........................ 701/36 |
| 6,253,143 B1 | * | 6/2001 | Silvernagle et al. .......... 701/93 |
| 6,306,063 B1 | * | 10/2001 | Horgan et al. .............. 477/108 |
| 6,629,034 B1 | * | 9/2003 | Kozak et al. ............... 701/200 |
| 6,807,481 B1 | * | 10/2004 | Gastelum .................... 701/209 |

* cited by examiner

*Primary Examiner*—Toan N. Pham
(74) *Attorney, Agent, or Firm*—James W. Hiney

(57) ABSTRACT

An improved electronic programmable speed limiter for drivers of vehicles which can be preprogrammed and controlled from a remote location via a radio link to update the driver performance and adjust the controls on the speed limiter.

21 Claims, 21 Drawing Sheets

FIG. 2

Judicial Driver Information

Driver's Name: John Doe

Sex: ⊙ Male ○ Female

License Number: 10986917

State of Issuance
SD
TN
TT
TX

Is the Driver subject to impulsive actions? ○ Yes ⊙ No

OK
Cancel
Help

Start | PrtScr 2.0d <untitled> | Dr. Peter Cherouny's Pro... | 2:33 PM

FIG. 4

Judicial Driver Information

Driver's Name: John Doe

OK

Judicial Driver Information

Alcohol Violations

How many Alcohol Related Violations has the Driver had in the past five years?

○ 1   ○ 2   ○ 3   ○ More than 3

OK
Cancel
Help

Is the driver subject to inplusive actions?   ○ Yes   ● No

Start | PrtScr 2.0d <untitled> | Dr. Peter Cherouny's Pro... | 2:33 PM

FIG.8

Parental Driver Information

Driver Status
○ Recent Driver   ○ Young Driver
○ Speeding as a Habit  ○ Earned Trust Responsibility Level
Your Son is Responsible
○ 100% of the time  ○ 50% of the time
● 80% of the time   ○ 30% of the time Between 1:00 am and 3:30 am what speed will the vehicle be allow to go?
○ 30 miles per hour  ○ Full Speed
○ 50 miles per hour  ● Zero OK
Cancel
Help Start | PrtScr 2.0d <untitled> | Dr. Peter Cherouny's Pro... | 1:08 AM

FIG. 11

Commercial Driver Information

Driver's Number: 123456

Driver's Name: John doe

Age: 21

Sex: ● Male  ○ Female

License Number: 10986917

State of Issuance: SD / TN / TT / TX

Driver Category
- ○ Full Time Professional Driver Type 1
- ○ Full Time Professional Driver Type 2
- ○ Full Time Professional Driver Type 3
- ○ Maintenance Driver
- ○ Temporary Driver
- ○ Part Time Driver
- ○ Unrecognized Driver
- ○ Owner
- ● No Driving History

[OK] [Cancel] [Help]

Start | PrtScr 2.0d <untitled> | Dr. Peter Cherouny's Pro... | 4:08 PM

FIG. 12

Commercial Driver Information

Driver's Number: 123456

Commercial Driver Information

Has Alcohol Ever been a problem?
○ Yes   ● No

What is the Speed Limit of the Vehicle between 1:00 am and 3:30 am?
○ 30 miles per hour   ○ Full Speed
○ 50 miles per hour   ● Zero OK
Cancel
Help

OK

○ Full Time Professional Driver Type 3   ○ Part Time Driver   ● No Driving History Start | PrtScr 2.0d <untitled> | Dr. Peter Cherouny's Pro... | 4:08 PM

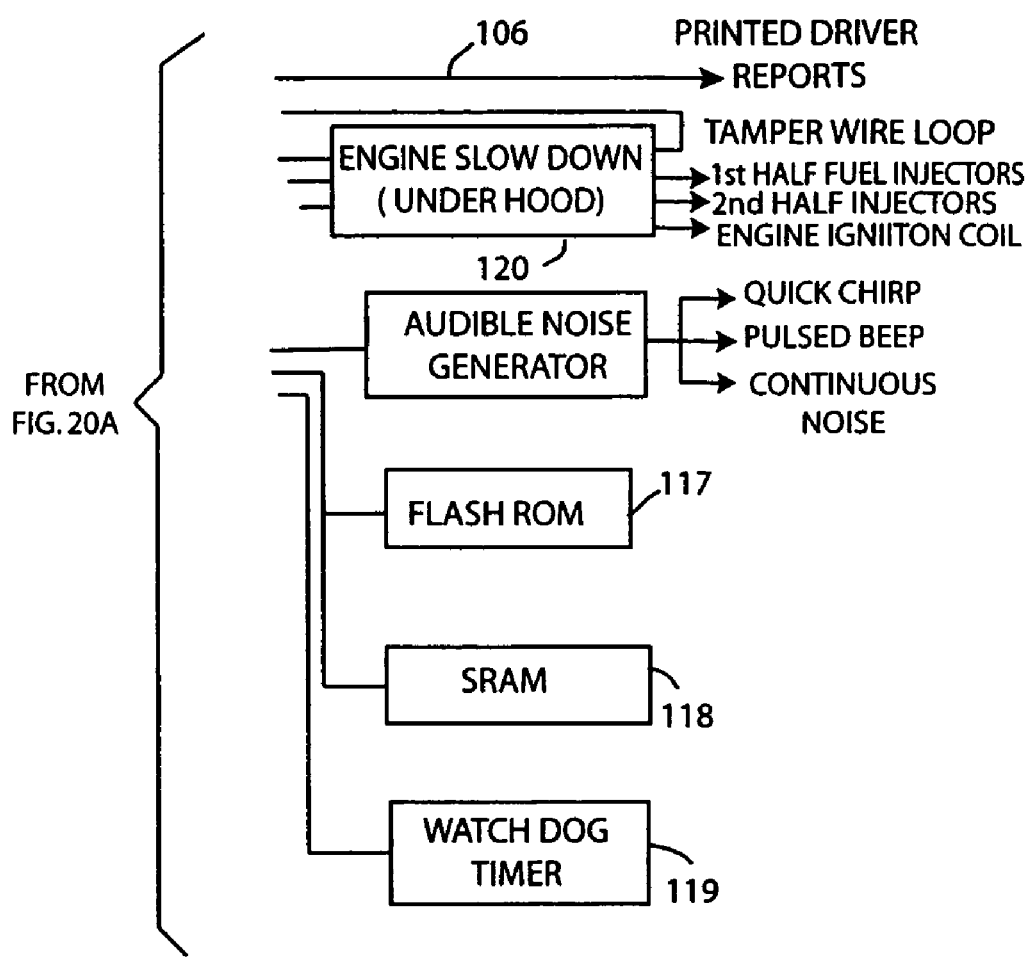

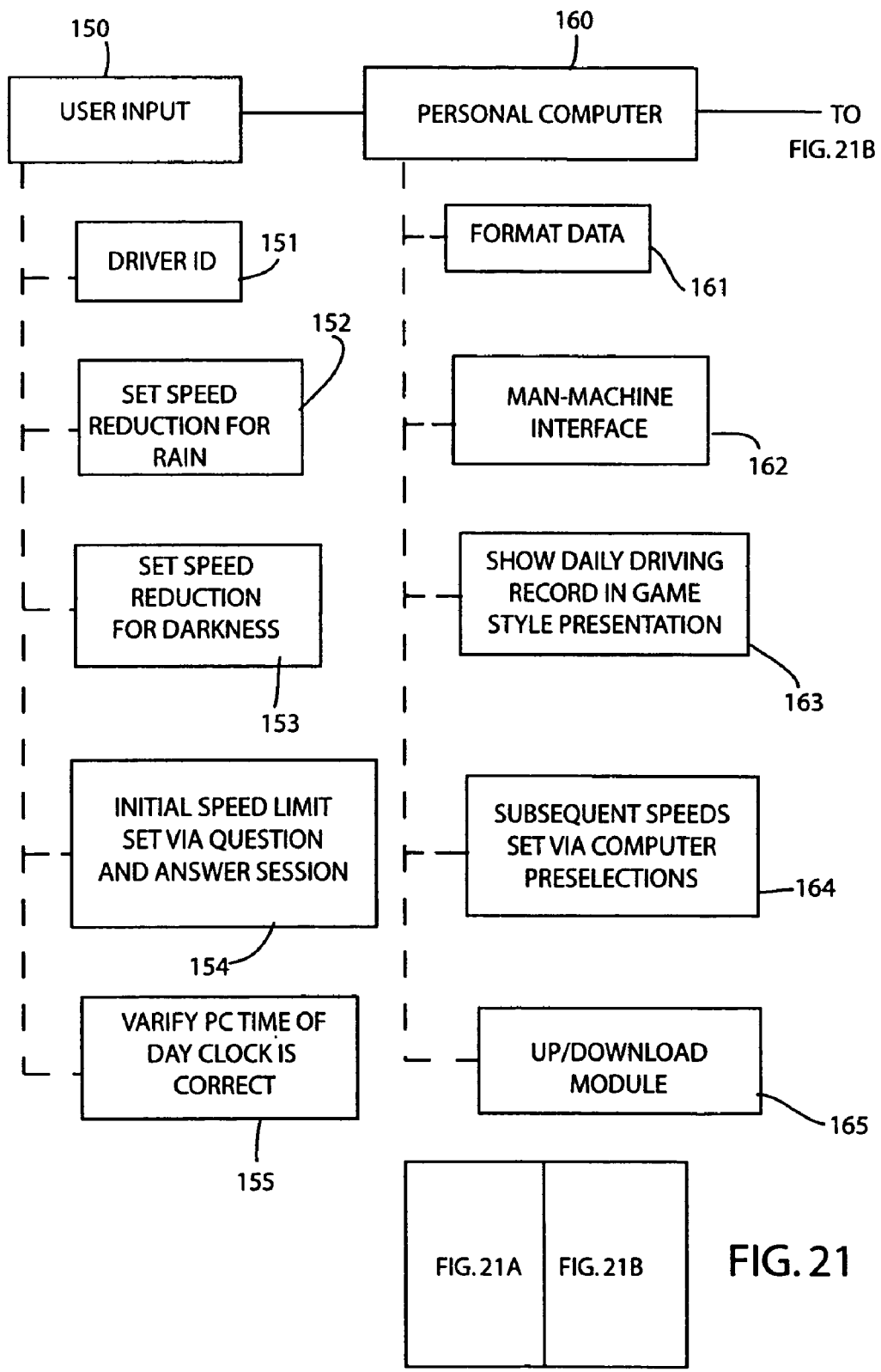

ELECTRONIC PROGRAMMABLE SPEED LIMITER

This application is a Continuation-In-Part of application Ser. No. 09/695,443, by the same two inventors, entitled "Electronic Programmable Speed Limiter" and filed Jun. 19, 2001 now U.S. Pat. No. 6,970,075. A claim of priority is made as to the substance and filing date of this application.

BACKGROUND

A major problem on the highways of the United States and other developed countries is the amount of vehicular traffic on the road. Not only are there an ever increasing amount of vehicles but the excessive speed at which they are traveling is increasing. This is due to political reasons, the raising of speed limits, commercial reasons, the commercial sector advocating higher speeds for interstate trucking and the very technological advances in the vehicles, both private and commercial, themselves.

The excessive speed of vehicles is the main contributor to accidents in general as well as injury and death associated with accidents when they occur. Therefore, to reduce highway accidents and deaths, this excessive speed of vehicles must be lessened. Reducing the excessive speed of vehicles, studies show, decreases the frequency and severity of accidents. There is a population segment which is at higher risk of accidents likely due to excessive speed. It is the purpose of this invention to limit the speed of vehicles of the at risk driver which will decrease accident frequency and severity within this population.

Driving faster than road conditions allow is involved in a large percentage of automobile and truck accidents. In addition, when an accident occurs at higher speed the risk of injury of the at-risk driver and others is increased. The instant invention will re-educate drivers to drive slower which will decrease accident frequency and severity. Novice drivers are especially at increased risk due to their undeveloped driving skills and their limited ability to judge risk. The novice group has been identified as significantly at risk and this is reflected in higher insurance premiums. The instant invention, a programmable speed governor, allows the vehicle owner to prospectively program a limit to the speed of the car in which it is installed. Additionally, the memory capability and driving database generated by the device allows for a review of compliance with the speed limiting governor. This review may be preferred for various reasons including insurance, liability and legal reasons and allows for an education of the driver in order to decrease speed and, hopefully, accident frequency and severity.

There is substantial research associating increased speed with an increase in the risk of collision with another vehicle or object. These higher speeds also contribute substantially to a higher risk of injury and death when an accident occurs. In a 1995 study, Cooper et al found excessive speed to be the violation most commonly involved in accidents resulting in injuries or fatalities. In the study of novice drivers, forty-one percent (41%) of those having had an accident claim had recent prior convictions for driving violations. Additionally, excessive speed was involved with sixty-nine percent (69%) of these violations with an additional seventeen percent (17%) including citations for failure to obey traffic controls (or running red lights and stop signs) which is often associated with speeding. In those accidents which produced casualties, forty-two percent (42%) of drivers had recent prior convictions for driving violations, the vast majority of which was for speeding. Cooper et al concluded that prior convictions, mostly for speeding, is a very good predictor and early warning system for novice drivers whom are likely to be involved in automobile accidents. The data strongly suggests that the prevention of speeding will lead to an immediate decrease in the accident rate as well as the cost to property. These statistics can be used to develop intervention strategies to decrease the likelihood of auto accidents resulting in injury or death. An additional finding of the study by Cooper et al was that novice drivers involved in accidents where they (as opposed to another party) were found to be at fault were likely to be driving either (i) for pleasure or (ii) to and from work in a car for which they were neither the principal operator of the car nor the owner of the car. This suggests that in most accident cases involving a novice driver, they are most likely driving their parent's car to go to or from a job or were just "cruising". The parent, whose car is being driven, thus has a vested interest in having an ability to prevent violations which result in an increase in accident risk.

The higher incidence of accidents among young drivers has been attributed to risk taking attitudes manifested as reckless driving, particularly speeding and tailgating. The urge for risk taking and sensation seeking peaks during the late adolescence and, coupled with a lack of driving experience, which prevents novice drivers from accurately calculating or perceiving the risks involved with their driving style, is clearly a deadly combination. A study in 1993 in Los Angeles found that drivers eighteen to thirty were more likely to report speeding often or most of the time than drivers in other and older age groups. Specifically, drivers aged eighteen to thirty report speeding "often" (60% of the time) with thirty-one percent (31%) reporting running a red light in the past month a violation often accompanying speeding. The study went on to report that drivers admitting they drove after drinking alcohol were significantly more likely to speed and run red lights. The inability of youth to appreciate the horrors of risk taking in a vehicle, often accentuated by alcohol, likely contributes to these attitudes. Alcohol is either a "cause" of accidents by preventing the driver from assessing the situation correctly or a "contributor" to the risk taking associated especially with younger drivers. If one can limit the speed of the vehicles, then a clearer understanding of what contributes to or causes an accident can be attained. In addition, an accident at lower speed will result In less property and personal damage and injury.

Who then can be said to be a potential user or market for the programmable speed limiter? Certainly the parent or principal vehicle owner can be said to have a vested interest in decreasing the risk of his or her son or daughter having an accident with their vehicle. Decreasing the speed of a vehicle one's own child is driving effectively reduces the chance of injury or death of said child. In addition, the ability of the parent to use the instant invention to monitor driving performance is a prerequisite to education of the child about driving risks to result in fewer violations and/or accidents and lower costs of ownership of the vehicles.

Another use of the instant invention are owners of vehicles who have a high violation record index and are said to be "at risk" drivers. Courts can impose the restriction of having a speed governor on one's car if one has a bad driving record yet needs to keep driving to keep a job or the like. The judiciary currently imposes restrictions on these drivers such as breath analyzers, which can stop the vehicles motor, for drunk driving convictions. The National Highway Traffic Safety Administration has considered, and some states have imposed, provisional driver licensing guideline among its efforts to reduce the public safety hazard of the risk taking and novice driver. As the restriction imposed by the instant invention is on the car, not the driver, it would be easier to enforce. The authorities could demand the insertion of the programmable speed limiter and the driver could not alter it resulting in forced, reviewable compliance.

Yet another market exists for the instant invention among companies who hire drivers for commercial purposes. This ranges from couriers to interstate trailer trucks and limiting the speed of the commercial vehicles would bring a welcome sigh of relief to the segment of the population that must travel on interstates. Incredibly, motor vehicle injuries account for one third (33%) of the work related deaths and therefore, decreasing the number of accidents would directly affect worker safety. The present check on interstate rigs is for viewers of the infractions to call 800 numbers, which is estimated that only result in about 10% of the infractions being reported. In addition, the driver always can argue that the complainant was wrong and there is no factual evidence to refute it. With the instant invention, the memory capability of the speed governor allows for a permanent record of the drivers possible violations. It would identify individual driving habits which should afford the fleet owner the ability to improve driver safety, likely decrease accidents and violations resulting in significant insurance property, workman's compensation and liability insurance savings.

The instant invention also contemplates the ability to employ GPS technology in its overall control system by making it remote and location sensitive. Both the computer part of the moderator and the car monitor can be used together with the GPS technology to slow the car down in certain areas such as school zones or construction zones. A sensor can monitor special electronic warning alarms established by the highway department of the area so as to automatically limit the speed of the vehicle.

BACKGROUND ART

There have been attempts to regulate the speed of motor vehicles in the past but none have been successful. There have been attempts to sense the speed of a vehicle with a pulse width digital signal train that is fed into an analog linear circuit and a DC voltage proportional to the speed is produced. This common practice of pulse width integration to obtain a voltage proportional to speed has been around for many, many years. The method lends itself to operational amplifiers and analog computing The instant device counts clock cycles between rising edges as well as any other part, such as the falling edges or even voltage levels, of the square wave coming from an additional wheel sensor similar to the antilock ABS sensors on one of the wheels. This digital computer version of speed detection is unique when used with the other features of the device. It is contemplated to put a sensor like the ABS sensor on the same cog but around the axle axis a few degrees.

Other devices use a reference speed which is inputted to a keyboard device via thumbwheels. Devices like this use an expensive computer with sophisticated man/machine interface. The use of a remote controller to do the man/machine interface in the present application is unique because it allows for a smaller and less costly mobile unit.

One of the problems with the earlier devices is that they didn't have the computing power now available and did not foresee the need for such. The older components used did not have the sophistication of an X-scale (Intel) processor.

In U.S. Pat. No. 3,878,915 a speed-limiting device is disclosed. The device senses the speed of a vehicle with a pulse width digital train that is fed into an analog linear circuit and a DC voltage proportional to the speed is produced. It was common practice of pulse width integration to obtain a voltage proportional to speed and this idea is well know. The method lends itself to operational amplifiers and analog computing. The instant device counts clock cycles between square waves coming form an antilock type sensor on one of the vehicle wheels or axles or from another digital speed sense location on the drive chain, i.e., it is a digital detection of speed. The instant device determines the maximum speed profile by the use of the driver's unique number encoded through the key fob. With the prior art, the code entry only happens at one point, namely the beginning of the trip. It does not allow for shutting down the vehicle only after exhaustive attempts have been made to get the driver to slow the vehicle over many days. In addition, in the prior patent the code entry into the device only happens at the start of the trip as opposed to the instant invention where it intervenes at any point along the journey where excessive speed is present. Each of the drivers allowed to drive the vehicle have a table of speeds and times and conditional codes that determine the maximum speed given a set of real world conditions. The table also contains values that configure the severity and quickness with which the computer moves through the increasingly punative disincentives, the last of which is to shut down the engine. The instant invention has a remote keypad which is really the keypad of the PC. The term "predetermined timing schedule" in the prior art patent is vague and unclear. The instant invention targets several time blocks for maximum speed reduction and for vehicle operation. The use of thumbwheels on the prior art device does not function as well as the means used in the instant invention. The prior art device also requires recycling of the code whereas in the instant invention the code is selectable over a wide range. Unlike the prior art device, the invention does not produce a speed signal but rather loads a register with a count from the speed sensor that is integral with the antilock brake device or other sensor. The correction for vehicle speed versus calibrated miles per hour is a number loaded via the infrared "IR" link. As alternative to infrared link, the instant device can use a radio link in addition to the infrared capability.

The instant device allows for the authority figure to be a player in the process unlike the prior art. This is accomplished by the delayed download of the limiting information to dictate the operation of the vehicle. This limiting information is contingent on the driver successfully operating the vehicle reasonably under varying conditions. The idea of how many and how long these excursions out of the preselected boundaries are allowed will vary from driver to driver and are inputted via the home PC software. The prior art device has no ability to make such a decision nor does it have a record of the driver over time. The only way it could function is to allow the driver to drive in a "passing" mode every few seconds which is unrealistic.

In the program, the reference speed is inputted to a keyboard device. While this may appear to be similar to the instant invention it is not as the instant invention uses a keyboard entry on a more expensive and complicated computer with a more complex man/machine interface. The use of a remote computer to do the man/machine interface is novel because it takes the cost and size burden off the mobile unit. As the unit has no keyboard and visual screen it is much less complicated to build and thus has more utility per dollar. The more expensive computer can be shared with other functions and the cost amortized. It uses all the 3D graphics and the audio functions as the home PC to more effectively communicate with the user of the device by incorporating an interactive video game interface. This video game interface uses physics simulation techniques to create an imaginary 3 dimensional world on the PC screen whose purpose is to engage the young driver and use the attention gained to educate the driver in safer driving practices. The video game will have two parts. The first part will be to entertain the user and to direct the young driver to their daily driving infractions. The software then uses the cumulative daily infraction data as the basis for deciding whether the driver needs driver education. It the driver needs education, based on the infraction history, the driver is directed to watch driver education films. The last portion of the video game software will generate the next day's settings for speed and delta times between Shutdown options and the level of intervention based on its internal trust coefficient. The trust coefficient is a cumulative number that provides a steady progression from starting an untrusted driver to a fully trusted mature driver. Finally, there are two parts to the present devices software. The first part allows for setting all the parameters for vehicle operation. The second part being the video education software. Finally, U.S. Pat. No. 3,878,915 does not mention the detection of rain or darkness as additional speed controlling factors.

BRIEF DESCRIPTION OF THE INVENTION

The instant invention utilizes a programmable circuit which has an n-X-scale (Intel) micro controller therein to operate a circuit which integrates peripherals such as a memory controller, a programmable input and output, a timer and serial controller to increase system functionality and lower cost. The entire CPU circuit is mounted in a vehicle near the steering wheel where the key fob of the particular driver can be inserted for driver identification. There is an optional device that extends the key fob reader portion of the device close to the ignition location of the vehicle in cases where mounting the Moderator under the dash unit would not be acceptable aesthetically. This extension box contains the optoelectronic components necessary to read the unique number of the inserted key fob and mounts usually with industrial permanent tape or strong magnet near the ignition switch. This avoids drilling holes in the interior of the vehicle and doing permanent damage. There is an electronic box mounted forward of the firewall that contains the module specific for the brand of the vehicle. The CPU module is wired to the under the hood box and a connection to that wiring in the back of the dash mounting holder. The holder guides the CPU modules into the connector as the CPU module is inserted into the holder. The programmable unit is contained in a module which controls the speed of the vehicle and the memory function of the module itself. The unit is essentially a hand-held computer that is an integrated, low-voltage, single chip implementation of a high-performance 32 bit, X-scale compatible microprocessor with the extra logic needed for PC/AT-compatible PCs. It has a AMD386 or more advanced chip CPU core with a memory control unit, ISA bus controller and peripheral control logic.

The software has two parts. The first allows for setting all the parameters for operation. These parameters allow for multiple drivers in multiple scenarios. The detection of rain and darkness and tampering and are inputted to allow them to affect the operation of the vehicle at different times and to report to the parent or administrator the conditions at the time of an infraction. This information to the parent or administrator is invaluable in making judgment calls in training the young driver in safe driving under these conditions. The driver does not have to remember codes as that function is now performed by the key fob function which identifies to the mobile computer who was or is about to operate the vehicle. This semi-automatic identification of who was driving eliminated two main problems with codes the first of which was forgetting the code. The second problem eliminated the need for an addition of a keypad and associated electronic hardware requiring a circuit de-bounce. The key fob allows the device to be mounted in an inconspicuous place and it can be inserted by feel alone. The owner of the software to program the mobile unit has the password right to enter the code.

Maximum speeds are generally determined by the codes entered.

However, the new, improved version of the invention, called a moderator, has a global positioning receiver linked to the CPU that receives the location of the vehicle from the GPS satellite system. The Moderator uses a linked mapping capability and database, located within a central server or within the Moderator or both, that allows the location data to identify the roadway section where the vehicle is located and the speed data of that portion of the roadway. This data is compressed in code to reduce the file size of this database. If a centrally located database is used, the data is sent via a remote wireless connection between the central database and the vehicle and the Moderator. Use of the speed data uploaded through this GPS wireless connection by the Moderator is prearranged by the administrator of the Moderator software program. Otherwise, the maximum speeds are prepared and determined by the owner. The Moderator is able to make the following responses to the car going faster than the speed limit as registered in the database programmed by the software.

1. Audible chirp
2. Voice warning explaining the set speed limit on that section of road and the consequences to the driving record.
3. Voice warning that the parameters were set to not allow speeding in that speed zone (i.e., in a school zone there will be no allowance for passing speeds).
4. Audible noise alarm at approximately 60 dB noise level (in order to annoy the driver.)
5. Shutdown of the first half of the fuel injectors of the engine.
6. Square wave enable to the second half of the fuel injectors to almost kill the engine.
7. Shutoff of the ignition.

Each of these responses will be on a preset time schedule based on the driving conditions, the driver's previous experience with the Moderator (the given driver's driving record database with the Moderator), and the administrator's choices within the software program for the Moderator. The administrator may elect all or only some of the options. For instance, the default for the Moderator will be to not have the ability to shut off the ignition unless this option is specifically chosen by the administrator with verification and appropriate warning regarding ignition shut down. There is a capability to progressively shorten the time interval between the above listed seven options or even to skip some options, depending on the choices made within the software programming, with more infractions in a given driving session generally resulting in a shorter time interval between options and a more rapid enforcement of up to all seven options by the Moderator.

Measures 1 through 7 will be preset based on a given driver's driving history as recorded in the Moderator's driving record database for that driver in combination with the administrator's wishes for how to react to an infraction (the software programming noted in the paragraph above.) The goal is to modify the behavior of the driver in a more permanent way than simply putting a speed governor on the engine that limits the maximum speed. This flexibility in the software programming will allow for a different response for differently skilled drivers and personality types. The overall focus is re-training the driver while staying within a safe operating speed for the given driver's driving experience.

The instant device does not totally disable the vehicle, as that could produce a dangerous situation, but rather allows two or more "reduced power" modes of operation to take over. The car will drive in the "valet mode" (10 to 15 mph) a speed that would likely result in a significant accident. The instant device will shut down the car only after exhaustive attempts by the electronic module to get the driver to slow the car down to the prescribed driving speed profile. The present device intervenes during a journey where bad driving is present. It does not kill the engine as most cars today have power steering and power brakes, which, if rendered inoperative, would require the driver to use more strength to bring the vehicle to the highway shoulder safely and would produce an unsafe situation. The instant device also changes the speed profile at certain multiple times of the day such as at dark, when it is raining, at closing time of clubs during the weekend or at times when the driver is not given the privilege to drive.

The instant device utilizes input selector codes. The data is not coded going through the infrared link. It is literal data describing the numerous profiles of all the drivers under all the different driving conditions. The profile is set up in the instant device and inaccessible to the driver. It does not produce a speed signal rather a register is loaded with a count per pulse from the speed sensor that is integral with the antilock brake device or other sensor. This is a square wave with multiple toggles per wheel turn. The correction for vehicle speed versus calibrated miles per hour is a number loaded via the infra red or radio link. The device compares speed to a dynamic speed limit which is unique.

The instant device does not cut off the ignition but has a slow down sequence which has several levels of sophistication. The first level sounds a short burst or chirp but does not record the infraction. The second level of this is that the excess speed of the driver is recorded so that it can be reported to an authority figure. That authority figure is the driving force behind altering the activity of the driver. This allows the authority figure to provide back up to his or her decision making on the drivers' performance. Another incentive provided the driver is the provision of an annoying sound or noise when the speed desired is exceeded for the pre programmed time. The sound level of this annoyance is 60–65 db so that a real incentive is produced to stop speeding. A quick beep is followed by a buzzing or alarm which goes from intermittent to continuous through the remaining steps to slow the driver down. The next escalation is to turn off half of the fuel injectors to the engine which will automatically slow the vehicle down while maintaining sufficient power to maneuver and drive the vehicle at slower speeds. The next step involves shutting off the remaining fuel injectors with a prescribed on/off cycle which allows the vehicle to be pulled over to the side of the road and burn the hydrocarbons still in the engine. This step is a last resort after all the prior steps have been employed. The ignition can ultimately be turned off. This renders a completely intoxicated driver harmless to others and the vehicle inoperable. The power of the stored data is the power of the instant device. The information recorded by the device allows the authority figure to alter the future behavior.

The use of full power digital computer negates the need for a reference signal as found in the prior art devices. The information of the speed and desired speed is contained in ASCII form or is downloaded wirelessly in real time and is not subject to all the problems that were associated with old analog computers such as drift, stray capacitance, signal degradation due to thermal shifts of the operational amplifier and electrical cross-talk 60 cycle noise from the local environment.

In the prior art devices, there was no way to make a record to guide decisions about future programming. The present device allows for a driver to pass a controlled number of occurrences but at some point that ability will be curtailed. If the driver has a bad record the ability to "pass" will be limited or denied. In addition, it would be easy to by-pass the prior art system by hot wiring around it. In the instant invention, the wiring harness has decoy wiring that forms a loop through all the various electronic modules. If the looped wire that threads through all of the modules is broken for even a moment the event is recorded and documented.

While the instant device does accept a pulse train as the input, the approach of how it deduces the speed of the vehicle is much different. The instant system does not depend on the pulse width only in the time interval between rising edges of the square wave. This method is superior in that the frequency of the wave can increase beyond that of the earliest prior art. In earlier prior art devices, an analog computer is present which integrates the square wave and produces a voltage proportional to it.

OBJECTS OF THE INVENTION

Accordingly, it is an object of this invention to provide an electronic programmable speed limiting device for motor vehicles, and It is another object of this invention to provide a programmable electronic device for motor vehicles which also records the driving speed over a given period of time, and It is another object of this invention to provide a means by which a parent can govern the speed of his or her car when it is being driven by a novice driver, and A further object of this invention is to provide a safety device for the "at risk" segment of the driving public by limiting the speed of the motor vehicle they are driving by programming in a speed limit, by adjusting for driving history, by reassessing allowable speed during rain or darkness A still further object of this invention is to use a remote computer to do the man/machine interface on a programmable electronic speed limiter for motor vehicles, Yet another object of this invention is to provide a programmable speed controller which is partially governed by a GPS system, allowing for identification of the road and location of the vehicle for adjusting speed limits according to vehicle location in real time.

These and other objects of the invention will become apparent when reference is had to the accompanying drawings which;

FIG. 1 is a screen showing the main control of the program with the emphasis on judicial information.

FIG. 2 is the screen of FIG. 1 now displaying judicial driver information such as the license number, FIG. 3 is a screen displaying judicial information such as moving violations, FIG. 4 is a screen displaying judicial information such as alcohol related violations, FIG. 5 is a screen displaying the "save driver information" key, FIG. 6 is a screen displaying the screen of FIG. 1 with the emphasis on parental information, FIG. 7 is a screen displaying parental information and license information, FIG. 8 is a screen displaying parental information as to preprogrammed status of driver and vehicle, FIG. 9 is a screen displaying saving parental information, FIG. 10 is a screen of FIG. 1 and emphasizing commercial information, FIG. 11 is a screen displaying commercial driver information, FIG. 12 is a screen displaying commercial driver record information, FIG. 13 is a screen displaying saving the commercial driver information, FIG. 14 is a top view of the module for containing the mobile unit of this invention, FIG. 15 is a side view of the module of FIG. 14, FIG. 16 is a front view of the module of FIG. 15, FIG. 17 is a top view of the module similar to FIG. 14 but showing the location of the wiring, alarm and infrared communications component FIG. 18 is a side view of FIG. 17.

FIG. 19 is a front view of FIG. 17.

FIG. 20 is a functional diagram of the operating system of this invention showing the various components in a diagrammatic view, and FIG. 21 is a functional diagram of the system of the instant invention showing the user input, personal computer, car monitor and warning and slowdown function relationship and FIG. 22 is a diagram of the moderator of this invention showing it receiving signals from a GPS satellite which provides location data to the computer.

DETAILED DESCRIPTION OF THE DRAWINGS

FIGS. 1–13 show the operating program on a PC used by the operator of this system to preprogram the operating scenario for the various drivers and conditions. The system show four data bases, namely Judicial Information, Parental Information, Commercial Information and Statistical Information.

FIG. 2 shows the screen for input of Judicial driver Information. As shown, the information can take the form of name, age, gender, operator's permit number and state of issuance.

FIG. 3 shows a continuing screen for other information such as the number of moving violations that driver has received within the last five years.

FIG. 4 shows a continuing screen showing the number of alcohol related violations the driver has received with the last five years and FIG. 5 is a SAVE function screen for saving the inputted information of FIGS. 2–4.

FIG. 6 shows the screen of FIG. 1 again with the emphasis on "Parental Information" this time. FIG. 7 shows the relationship of the driver to the parent as father and son and FIG. 8 shows an input for the parent to make to help the system arrive at a pre-programmed operation for the son.

Figure 1:
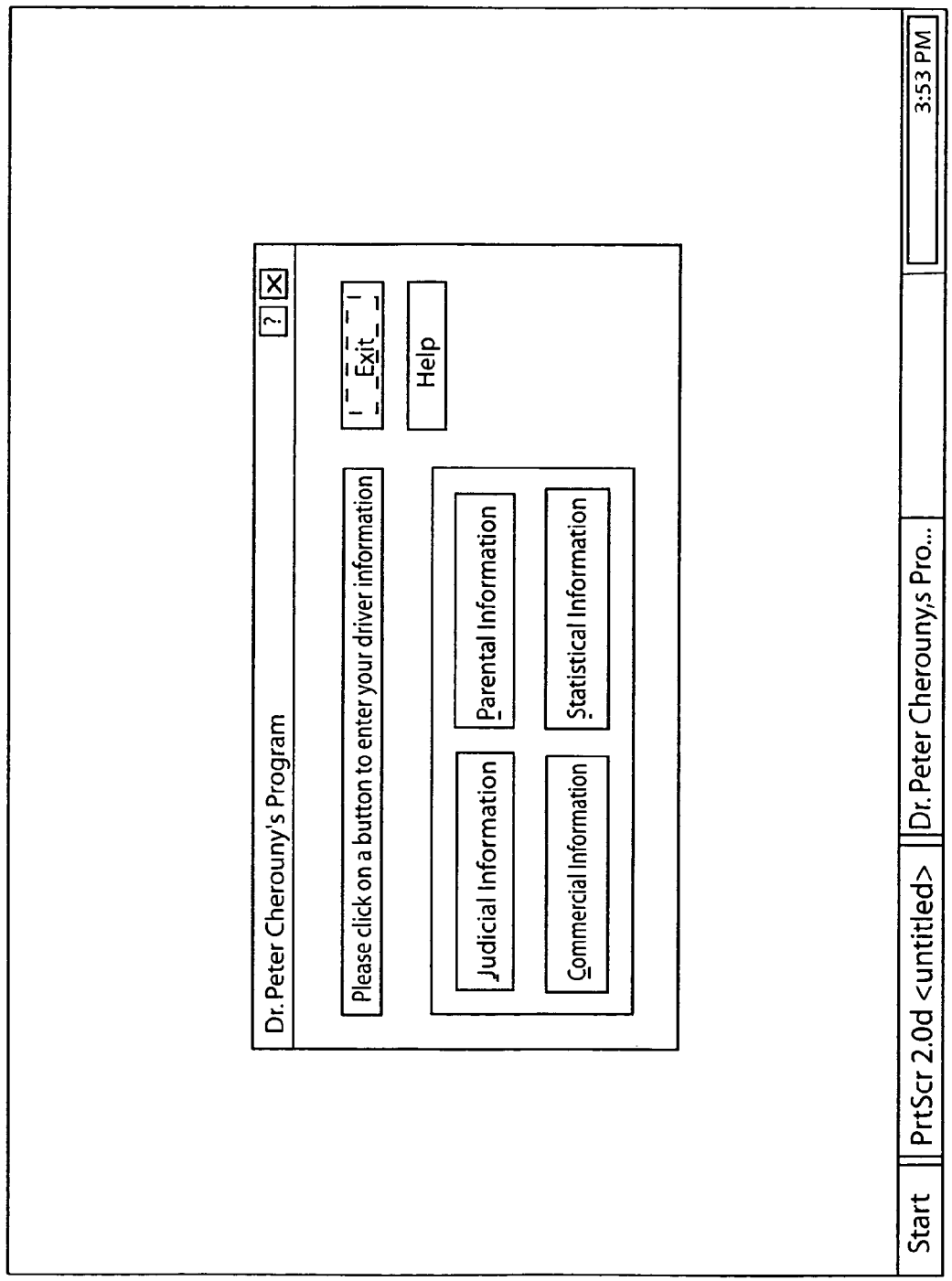
Figure 3:
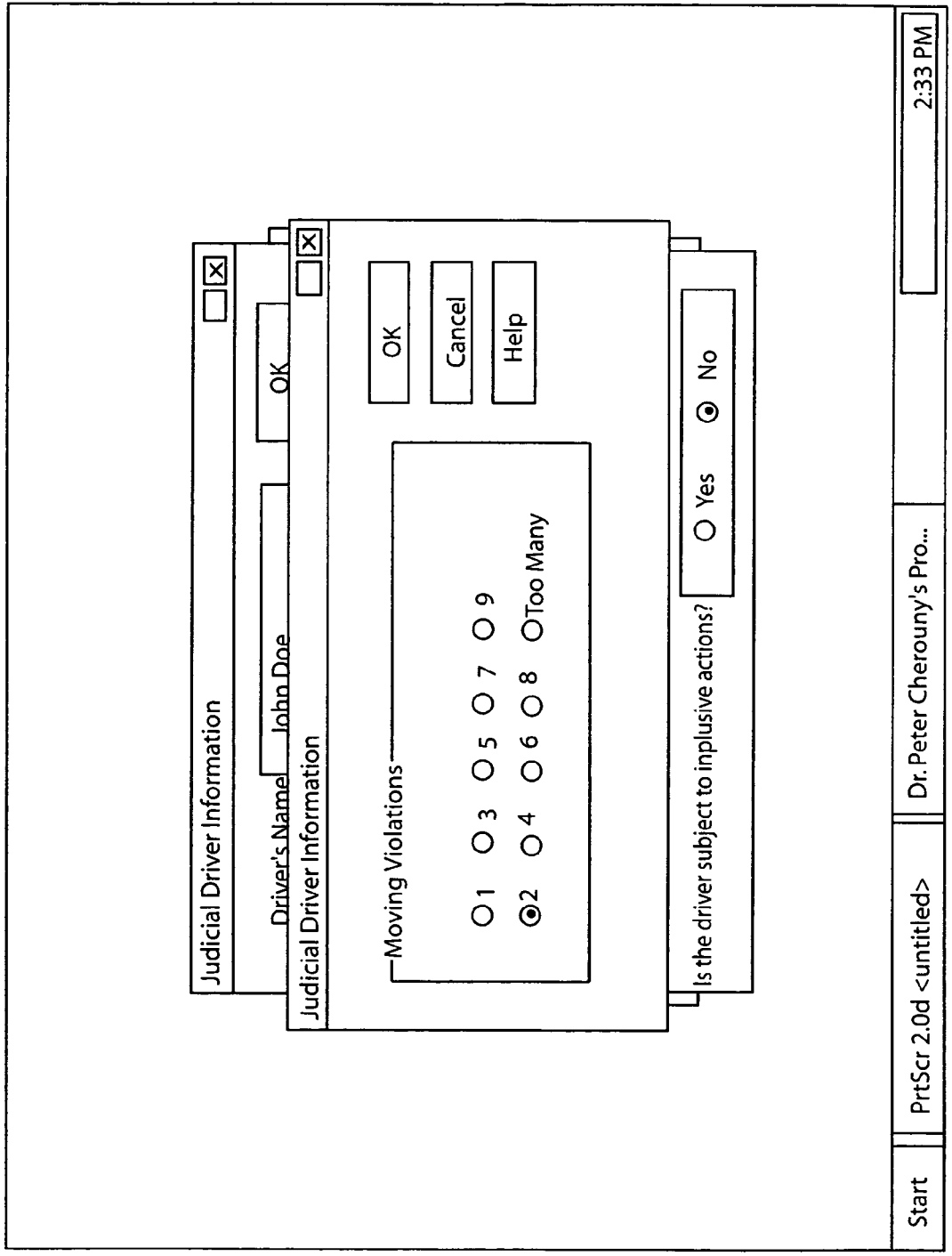
Figure 5:
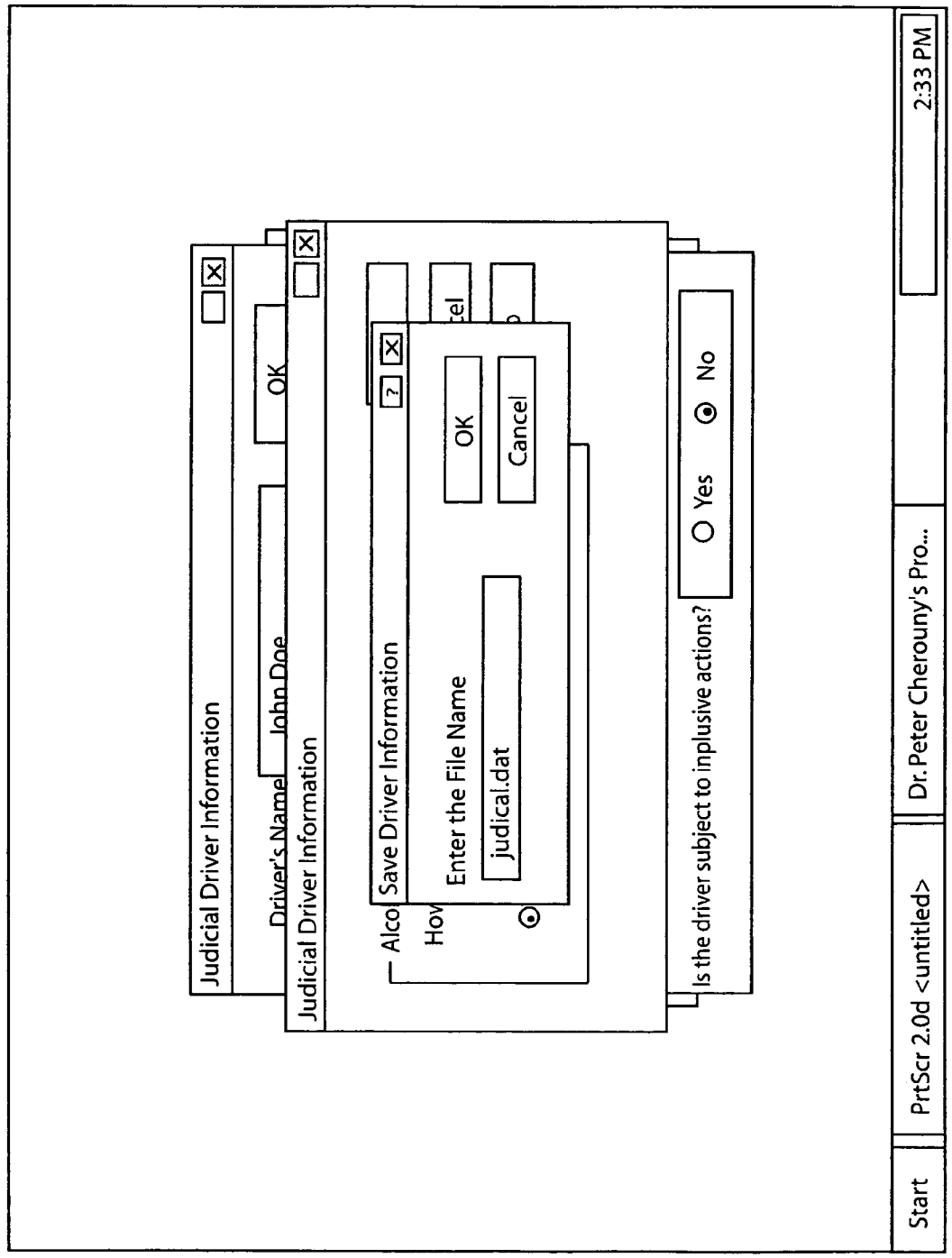
Figure 6:
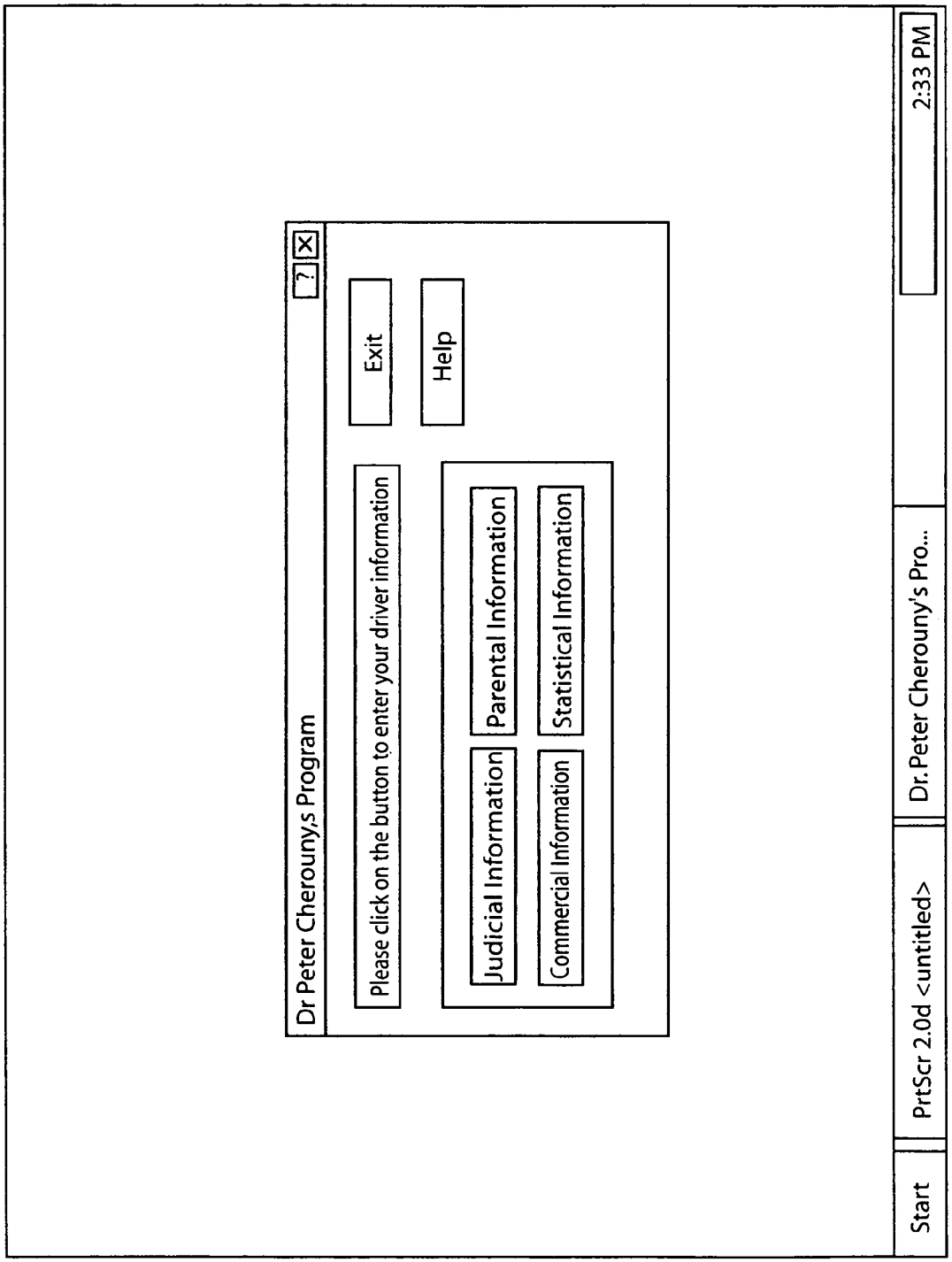
Figure 7:
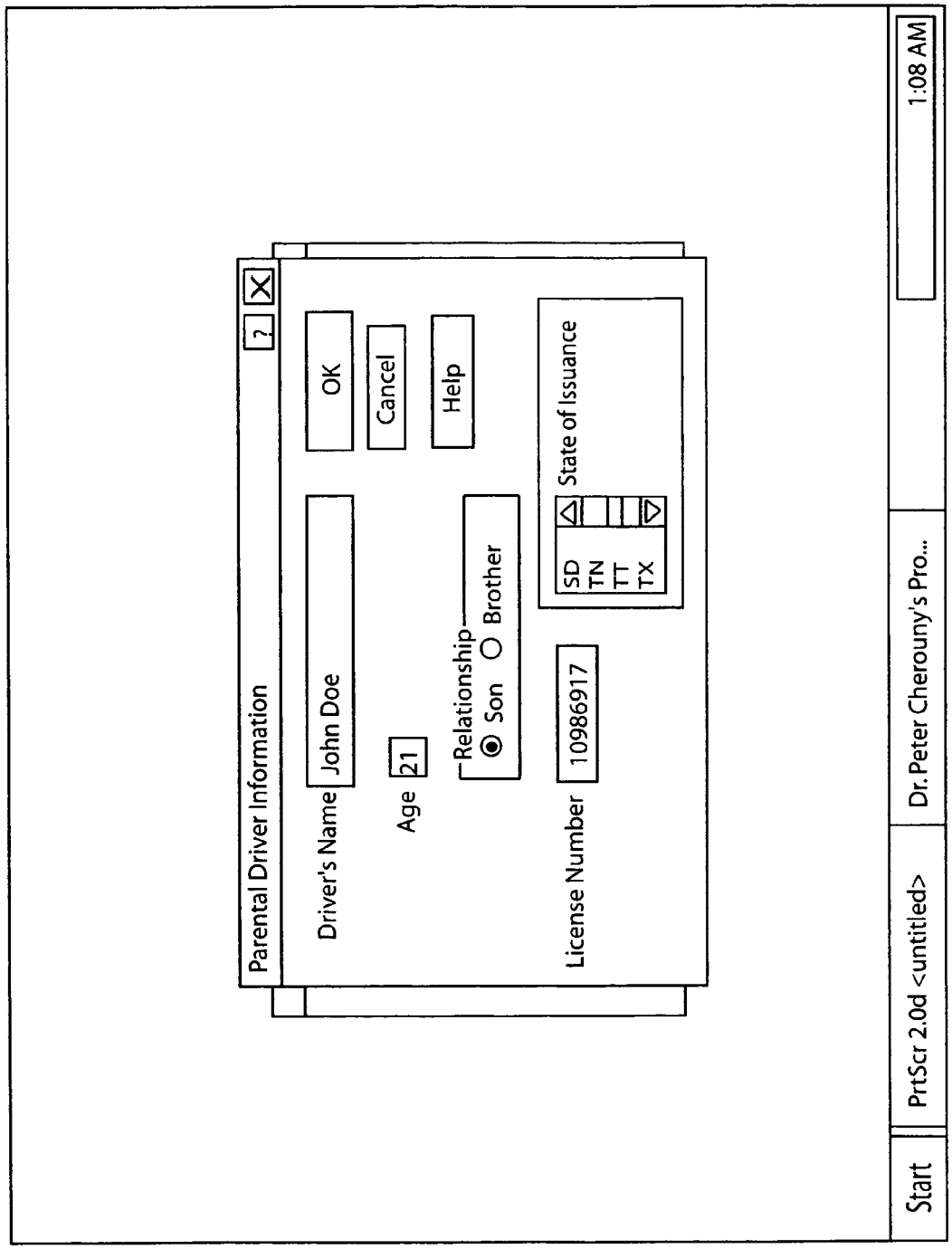
Figure 9:
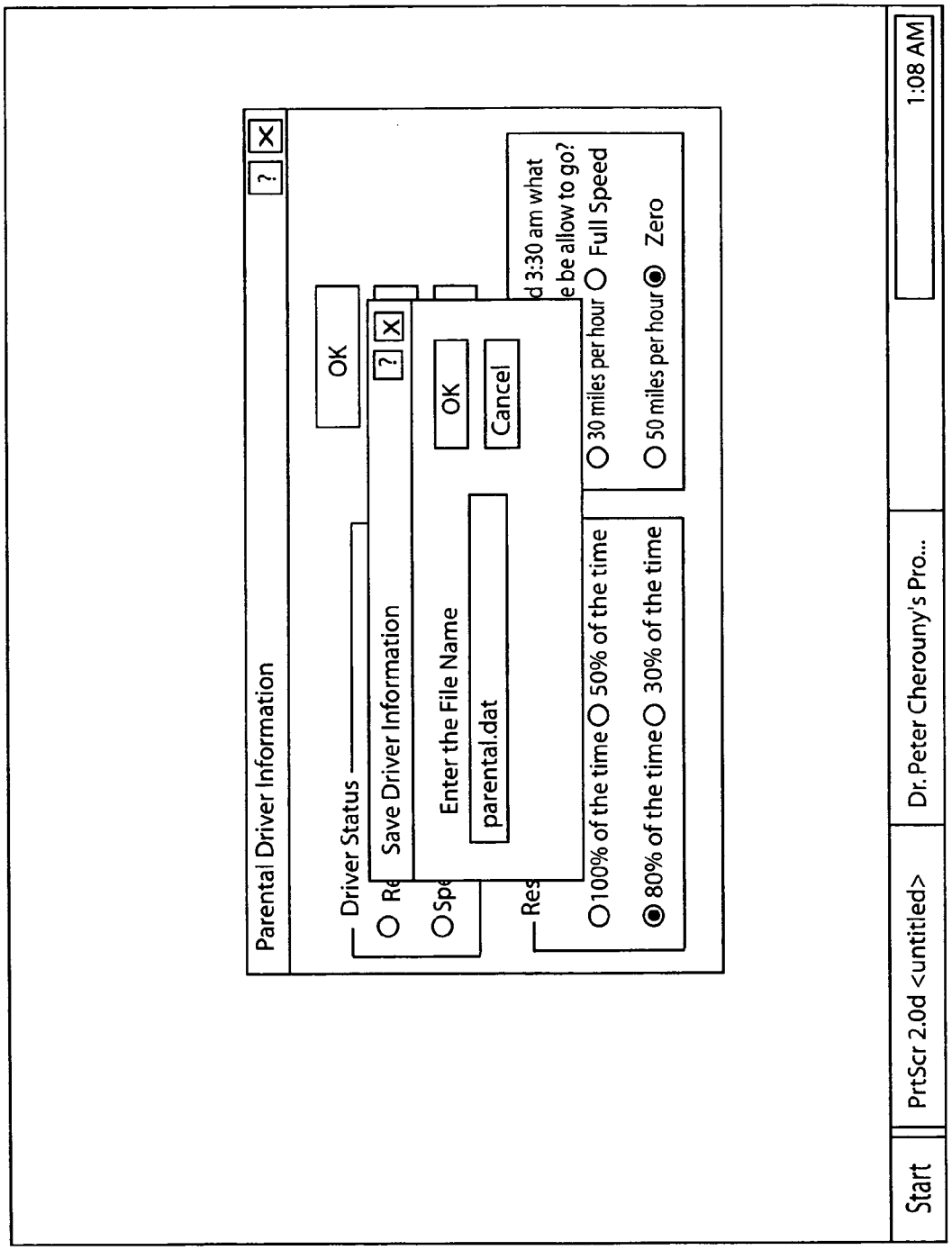
Figure 10:
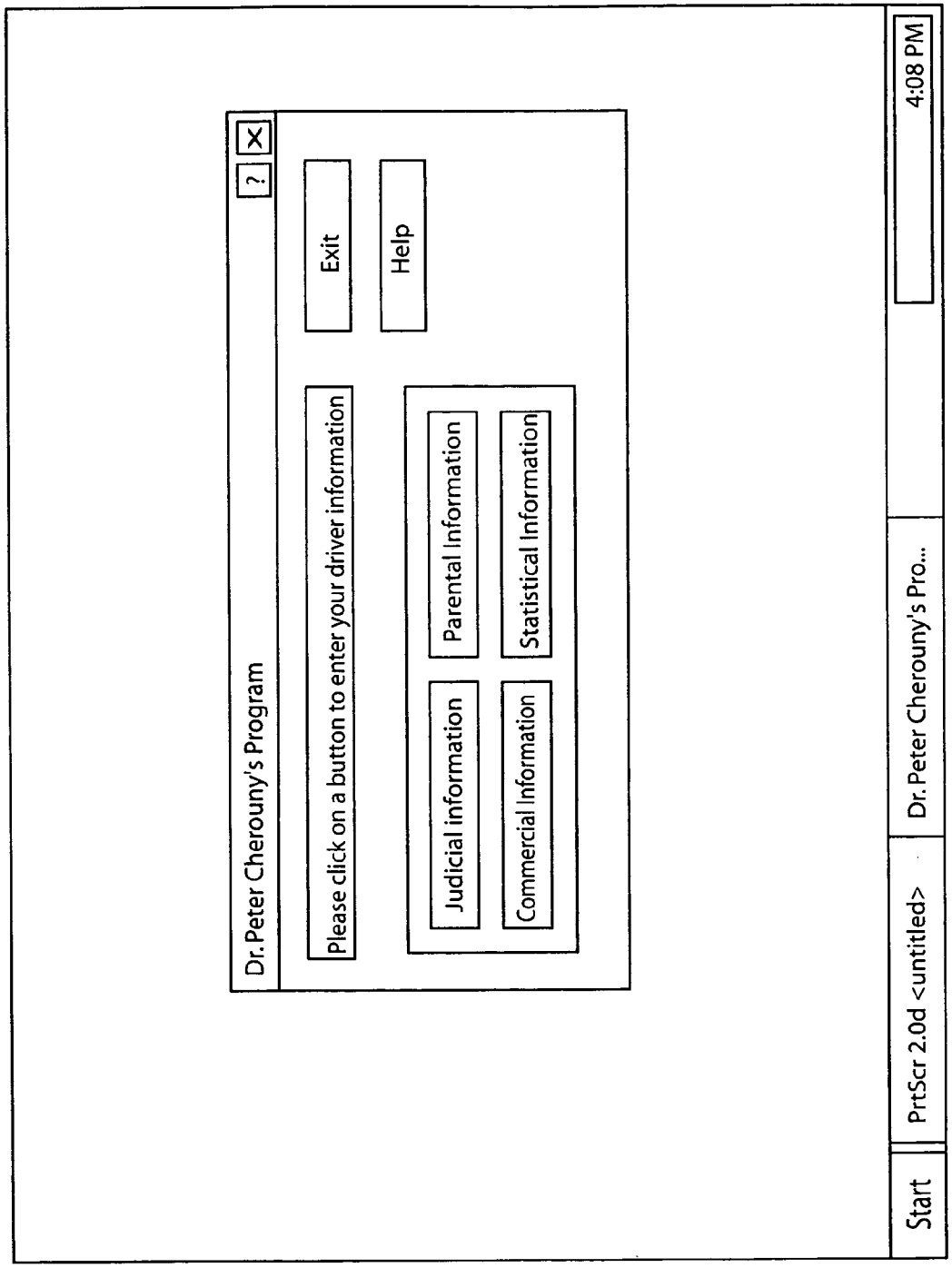

Note that a lot of "fine tuning" is available such as speed limiters for certain late hours and accommodation for certain demonstrated responsibility levels. FIG. 9 shows the SAVE function screen for the date entered under Parental Information. FIG. 10 shows the screen of FIG. 1 again with emphasis on Commercial Information. Like in the situation with a Judicial driver information, FIG. 11 shows the input for a commercial driver including status and driving history. It also notes whether the driver is full time or part time.

Figure 13:
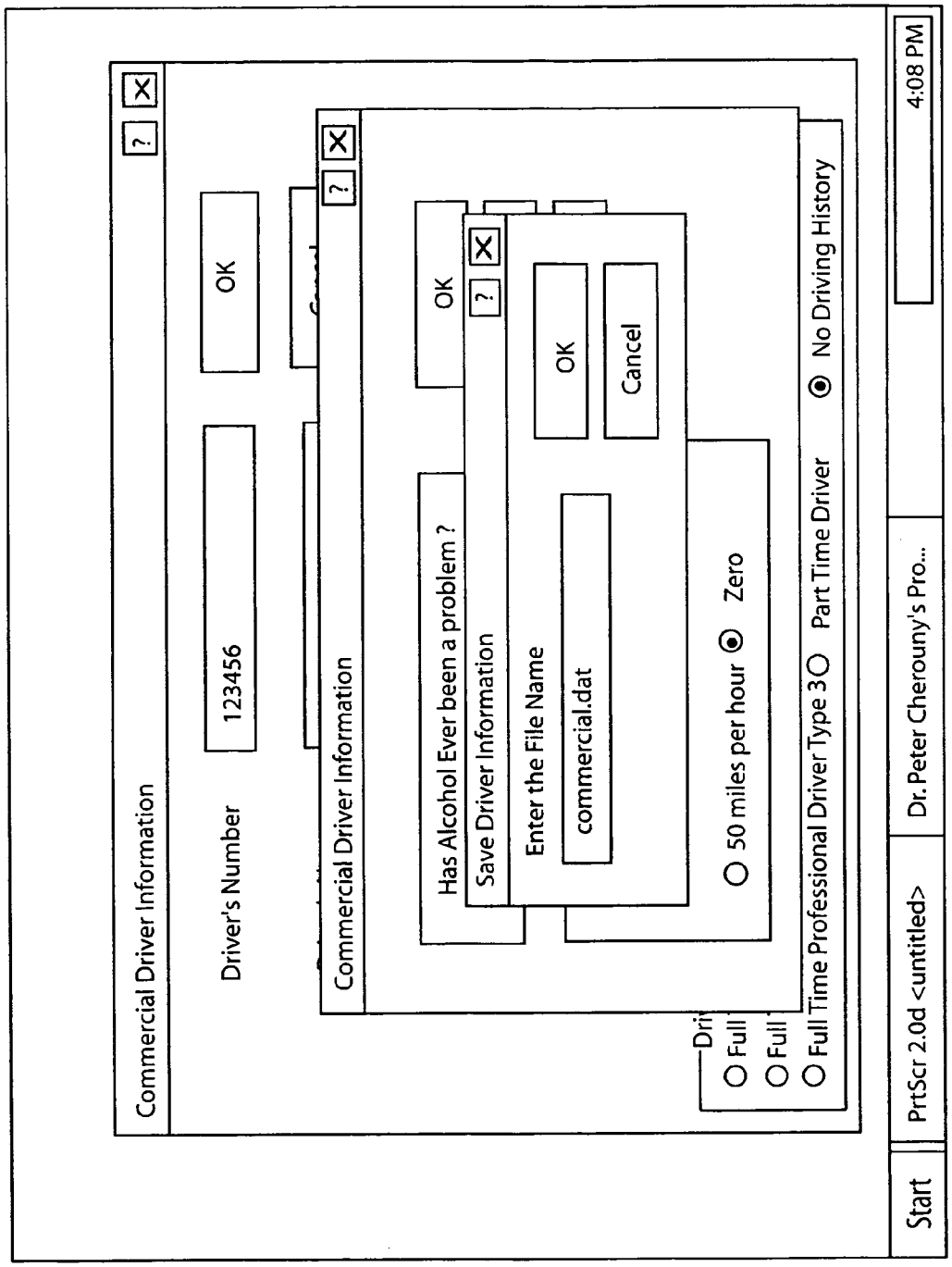
Figure 16:
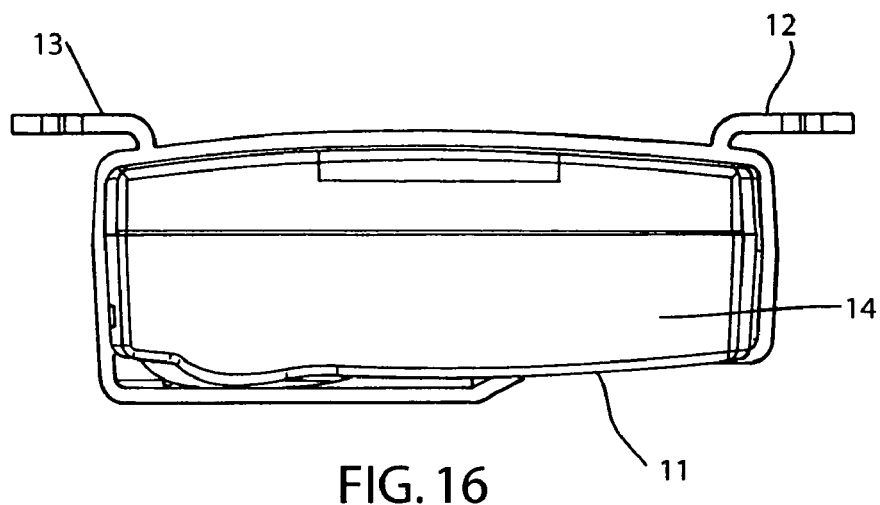

FIG. 12 shows an added input screen for entering alcohol history of driver into program as well as limiting speed at certain hours of the day. FIG. 13 is the SAVE screen for entering the data of FIGS. 11 and 12.

Figure 14:
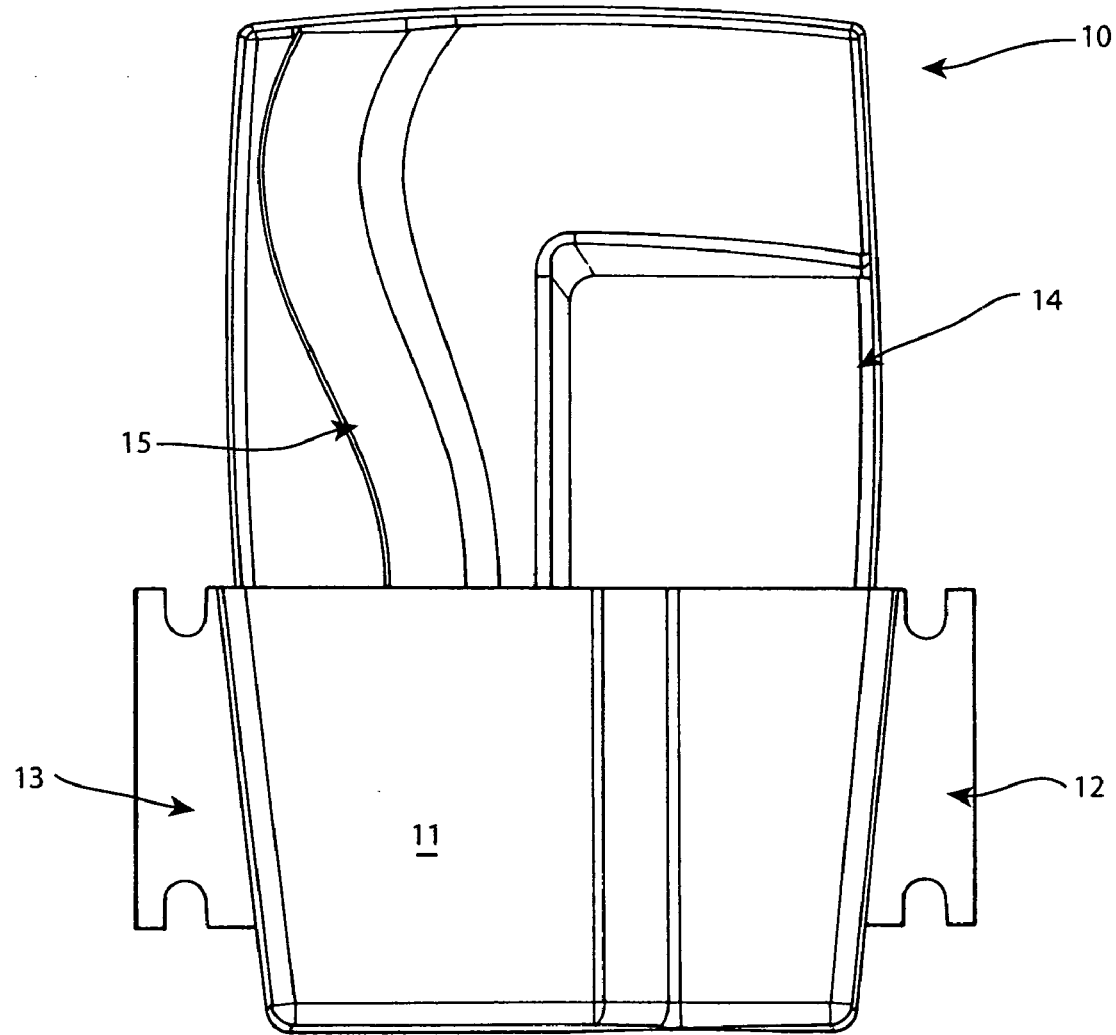
Figure 18:
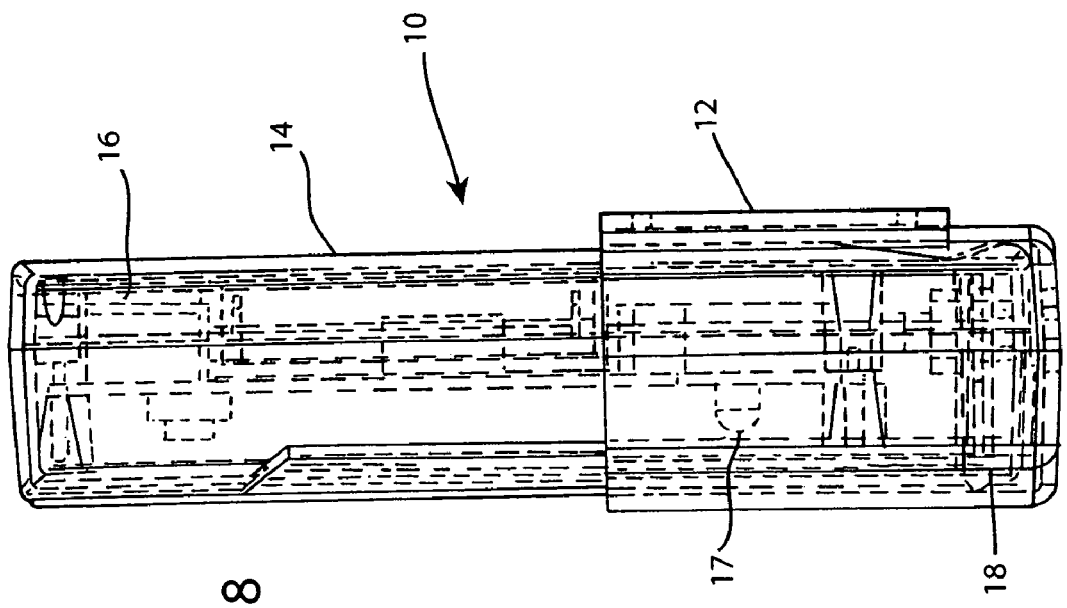
Figure 15:
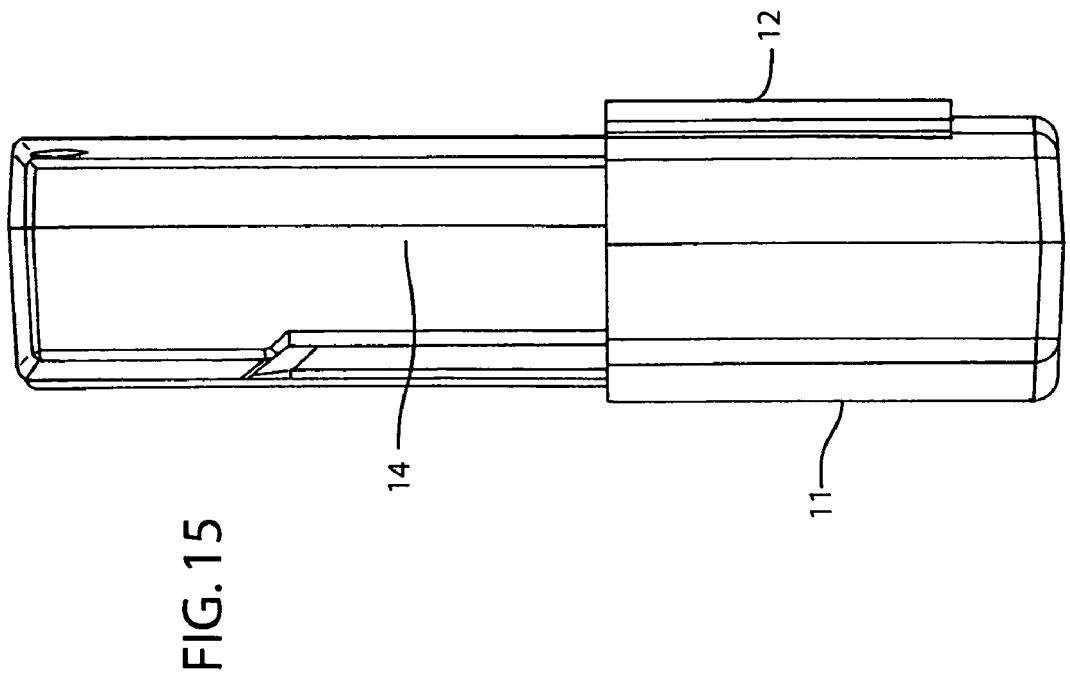
Figure 19:
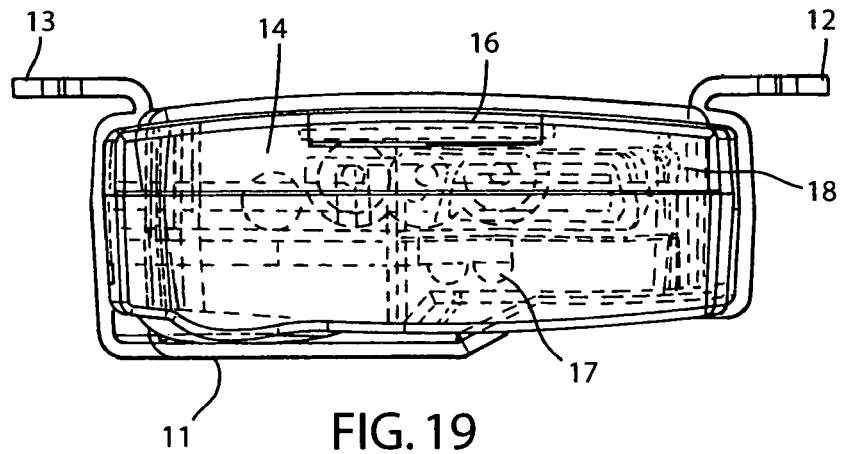
Figure 17:
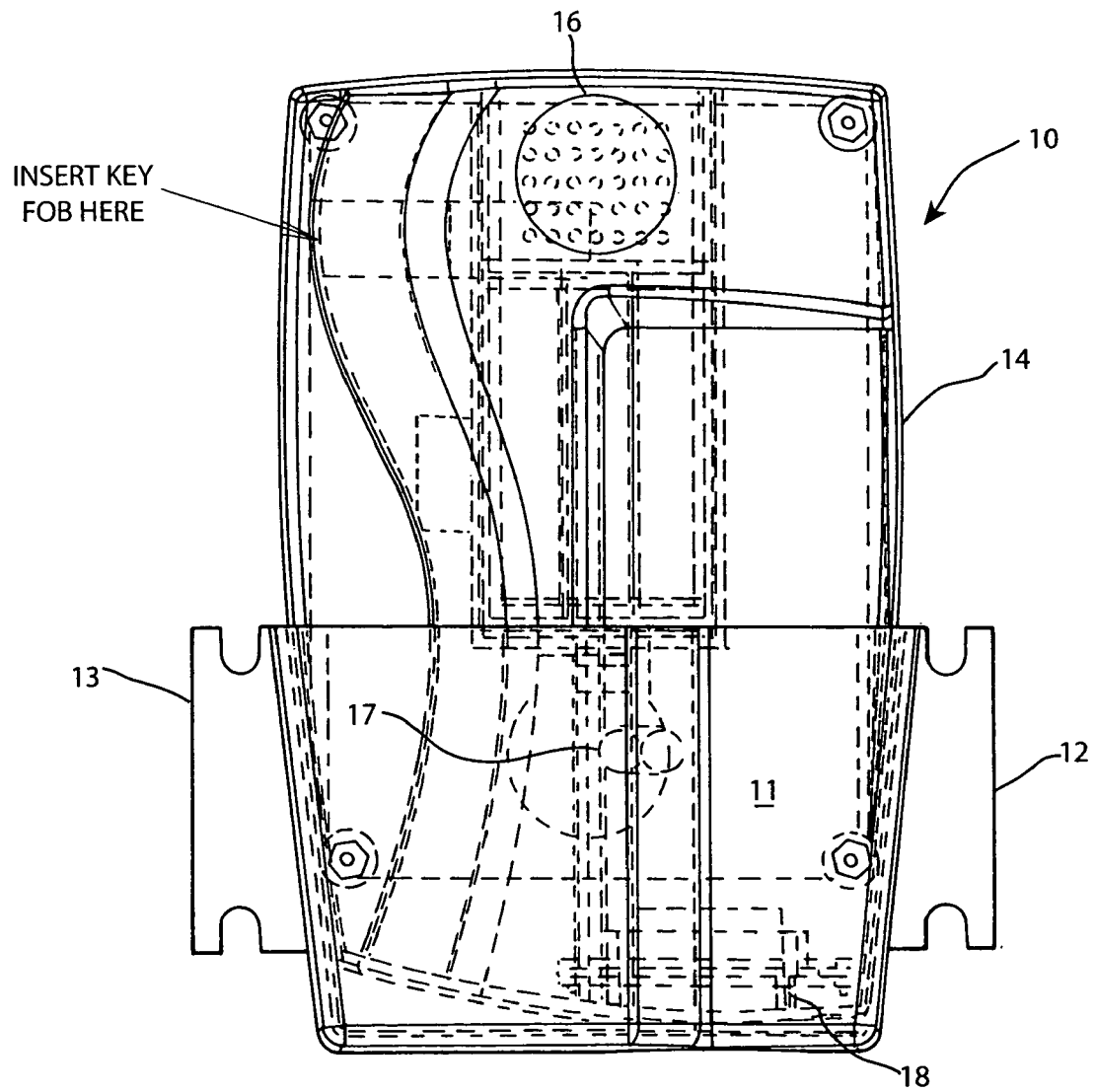
Figures 20, 20A:
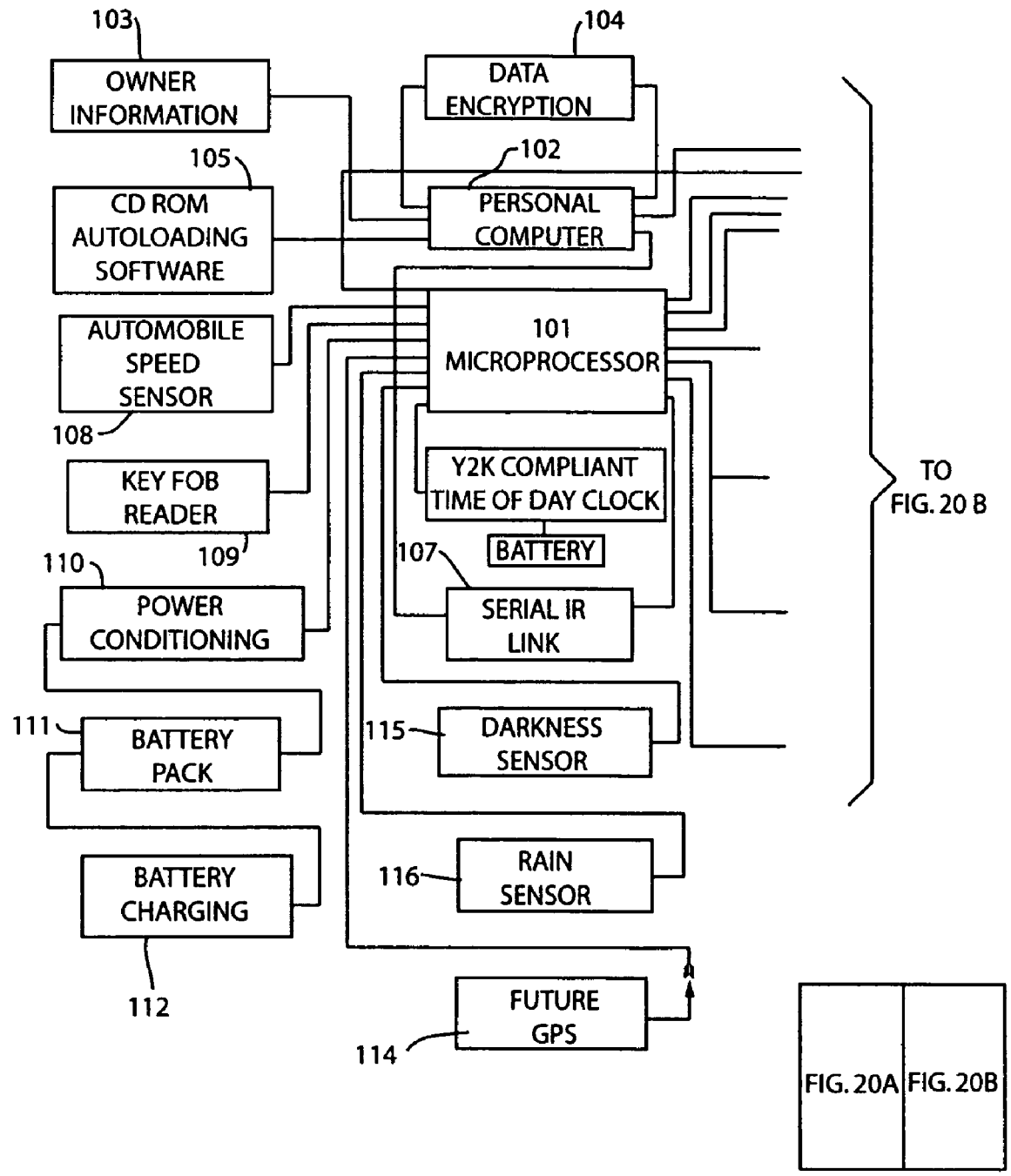
Figure 21B:
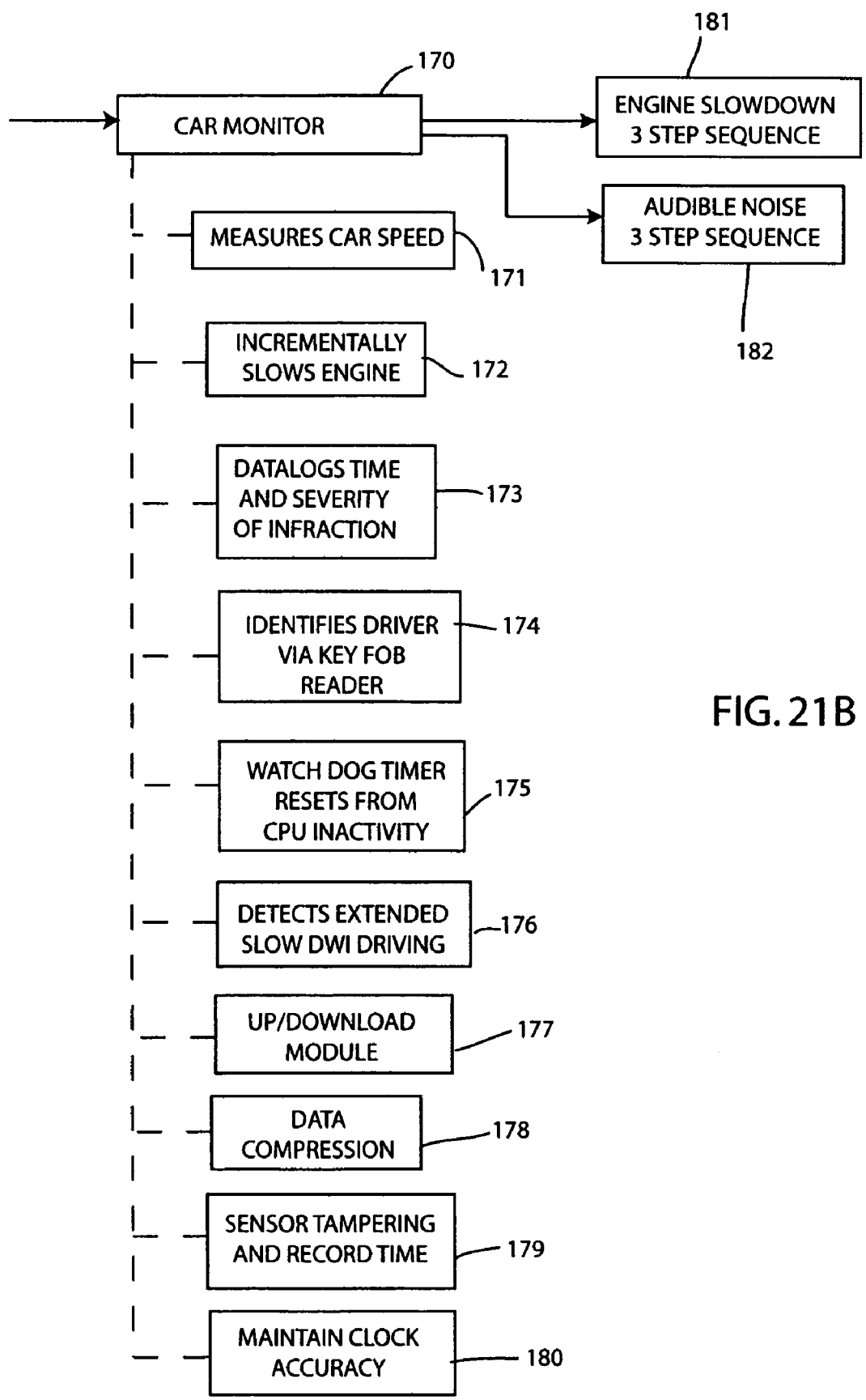

FIG. 14 shows the basic module of this invention which is secured near the steering wheel within the car and is generally denoted as 10. It consists of a permanently mounted lower portion 11 with securing flanges 12 and 13 and a removable portion 14 which contains certain programmable components. A design 15 is on the front cover of the removable portion. A microprocessor (not shown) is placed inside the unit 10 and the wiring therefore is located within the removable portion 14 as shown in FIG. 17 which shows the wiring and internal shape of the unit. Holes 16 are located in the front cover and serve to allow the sound from a 70 dB alarm to escape from the unit to warn the driver of programmed limitations on his or her exceeding them. Also located in the base unit is the connection 18 to the electrical system of the automobile. Depending on the preprogrammed instructions the connection can transmit instructions to slowly shut down the injector banks, about half at a time. It also carries the signals that sense rain and darkness, any attempt at tampering and the information form reading the shaft speed with a pulse train. FIGS. 18 and 19 show the side and front views, respectively, of the unit with the holes 16 and connection 18. FIG. 15 shows the side view of the unit of FIG. 14 and the unit is mounted, by bolts, U-bolts or other suitable fastening means near the steering wheel of the vehicle it is being placed in. Referring now to FIGS. 20 and 21 there is shown an overall diagrammatic view of the functional circuit that operates the system.

FIG. 20 shows the overall component diagrammatic layout of the system. The system is designated overall as 100. It utilizes a central microprocessor 101 which can be one of the E86 microcontrollers from AMD. Essentially it would be an AM 186 EM high performance unit with enhanced peripherals with a highly integrated design, integrated PC/AT compatibility. Enhanced AM 386 CPU core and built-in power management.

A personal computer 102 is used to input information into the unit. Owner information 103 is placed into the unit along with information on CD ROM auto loading software 105. A data encryption function 104 is used and output from the PC 102 can be downloaded into personal driver reports at 106. The PC 102 is connected to the microprocessor 101 by serial infrared link 107.

Connected to the microprocessor 101 are automobile speed sensors 108 which sense the actual speed of the automobile when in use. Also connected to 101 is a key fob reader which checks the identity of the user of the automobile to insure the instant user's data table is used. Components 110, 111, and 112 are the power conditioning unit, the battery pack and a battery charger. These components can be used to charge up the unit.

A clock unit 113 is also connected to the microprocessor and provision is also made for a GPS unit 114 for instant location information on the position of the vehicle on a predetermined grid.

Darkness sensor 115 and Rain sensor 116 are also connected to the microprocessor to supply data on the amount of light and whether the conditions are wet.

Also connected to the microprocessor are Flash Memory 117, SRAM 118 and a watch dog timer 119. The functions of these components have been described.

To facilitate needed action based on the actual sensor data and the preprogrammed driving program and engine slow down module 120 is provided which can initially cut our one half of the engine fuel injectors, the remaining half of the injectors and totally cut off the ignition coil to slow and/or stop the vehicle.

An audible noise generator 121 is also connected to the microprocessor for provision of various warning noises such as a quick chirp, a pulsed beep and a continuous noise. These provide warnings of increasing severity to the driver of the vehicle.

FIG. 21 shows the diagrammatic view of the functions of the drivers input, personal computer and car monitor. As shown the driver inputs of 150 include the drivers ID 151, the set speed reduction for rainy conditions 152, the set speed reduction for darkness 153, the initial speed limit setting 154 as a result of the question and answer session and a verification means 155 to verify the PC time of day.

The personal computer 160 is used to enter Format Data 161, to provide a man-machine interface 162, to show the daily driving record 163 in game style presentation, to provide data 164 for subsequent speeds set via computer preselections and to provide function 165 upload/download the module.

The car monitor 170 includes the functions of measuring car speed 171, incrementally slowing the car engine 172, providing data logs of time and severity of infraction 173, identifying driver via key fob reader 174, provisions of a watch dog time reset 175 from CPU activity, to detect extended slow DUI driving 176, to upload and download the module 177, to provide data compression 178, to sense tampering and record times 179 and to maintain clock assembly 180.

The output of the system provides an engine slowdown 181 in a three step sequence and corresponding audible noise alarms 182.

Figure 22:
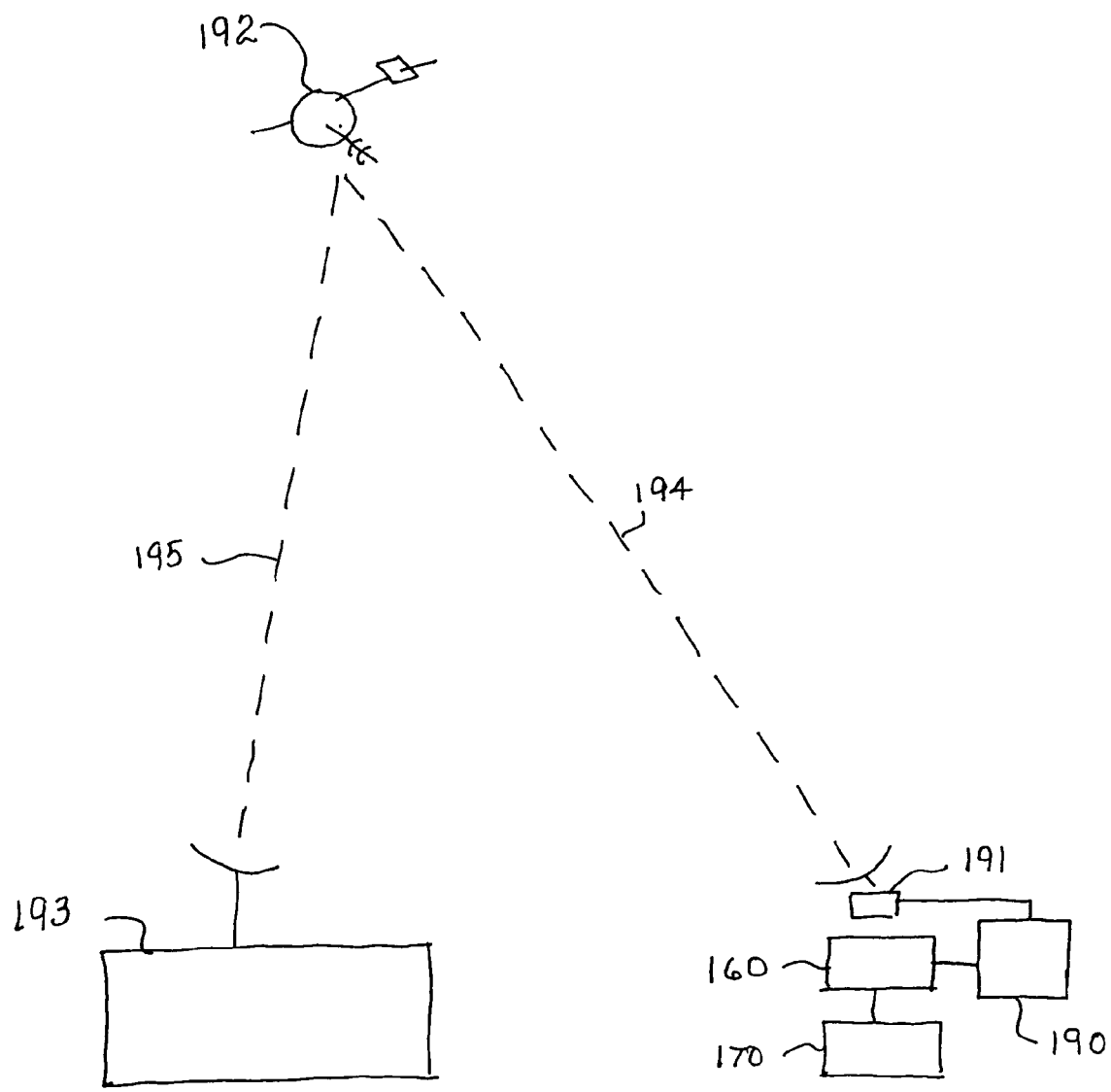

FIG. 22 shows the monitor 170 and the computer 160 connected to receiver/transmitter 191 which can receive signals 194 from a GPS satellite which is also adapted to receive/transmit signals 195 from a central ISP unit 193. The monitor 170 broadcasts locations signals to the satellite which checks with the central ISP unit 193 to ascertain whether it should slow down the vehicle or, in the alternative, give a warning of some kind. This feature helps the driver in a construction zone or school zone to react that much faster and before he or she is actually in the zone. If the driver does not notice the zone the alarm insures he or she is made cognizant of it. If the driver still does not slow the moderator can affect a slowing of the vehicle by itself.

Having described the preferred embodiment of the invention, it will be obvious to those of ordinary skill in the art to design other versions of this invention which are fully contemplated by the scope of the appended claims.

The invention claimed is:

1. A system for specifically regulating the driving performance of a given individual by use of a computer from a server in a central location, said system comprising
   a monitoring moderator means adapted to be attached to the vehicle the given individual is to drive,
   a data processing means having performance criteria preprogrammed therein and which relates to the driving performance history of said given individual associated with said moderator, said processing means operatively connected to said central server,
   wireless transmitting means associated with said moderator to send signals representing location and speed data of said vehicle at any given time to said central server
   engine control means associated with said data processing means and adapted to regulate operation of the engine of a vehicle in response to signals received from said central server via a GPS satellite system,
   whereby the operation of a vehicle by said given individual can be preprogrammed, recorded and closely monitored remotely from a central server location by automatically curtailing operation of the vehicle when the received data exceeds preset or personalized limits of said individual driver.

2. A system as in claim 1 wherein said data processing means performance criteria includes a settable speed reduction for rainy conditions.

3. A system as in claim 1 wherein said data processing means performance criteria includes a maximum speed based on historical information on said given individual including his legal driving record.

4. A system as in claim 1 wherein said data processing means performance criteria includes a settable speed reduction for darkness.

5. A system as in claim 1 and including a monitoring means module which is comprised of two sections, one section containing a micro controller with an infrared link and/or radio link for a direct linkage with a PC and the other section being adapted to be permanently attached to the interior of a vehicle, said first section being removable from said vehicle and said second section.

6. A system as in claim 1 wherein said monitoring means includes an antilock type sensor and said data processing means includes a clock.

7. A system as in claim 1 wherein said monitoring means includes means to monitor the speed of said vehicle by counting clock cycles as an assessment of part of a square wave coming from an antilock type sensor on said vehicle.

8. A system for remotely monitoring and controlling the operation of a motor vehicle, said system including;
   an electronic moderator means adapted to be mounted on a vehicle to be controlled and monitored,
   sensor means connected to said moderator means and adapted to sense the speed of said vehicle,
   data-link means on said electronic moderator by which control program data specific to a driver may be downloaded into a central database to create driving parameters for multiple drivers per vehicle,
   wireless transmission means for transmitting the data on a vehicle and its location and speed back to said central database to create driving parameters for any given driver of said vehicle,
   whereby the operation of said vehicle may be limited to preprogrammed parameters in terms of speed and other factors including the operators driving history or may be remotely set at the remote location.

9. A system as in claim 8 wherein said sensor means is also adapted to sense the presence of rainy conditions and said control program data is responsive to said rainy conditions being sensed by further limiting the parameters of the operation of said vehicle by said driver.

10. A system as in claim 8 wherein said sensor means is also adapted to sense darkness and said control program data is responsive to said data darkness being sensed by further limiting the parameters of the operation of said vehicle by said driver.

11. A system as in claim 8 including antilock type sensors and wherein said speed sensor means counts clock cycles at a point of the square wave coming from the antilock sensor on one of the vehicle wheels to give a digital detection of speed and loads a register integral with wheel speed sensor.

12. A system as in claim 8 wherein said electronic module means and said speed sensor means are programmed so that previously loaded vehicle operational limiting data is not downloaded into the PC based data screen until said driver has exceeded preprogrammed vehicle operation parameters.

13. A system as in claim 12 wherein said system additionally includes means to initially slow down said vehicle's operation by disabling a portion of its motor function when said initial vehicle operating parameters are exceeded by the driver.

14. A system as in claim 13 wherein said means to slow down said vehicle operation also is capable of stopping said vehicle if other preprogrammed parameters are not attained.

15. A system as in claim 13 wherein said system additionally includes means to provide an alarm prior to slowing down said vehicle by disabling a portion of it's motor.

16. A system as in claim 15 wherein said alarm takes the form of a human voice.

17. A system as in claim 15 wherein said means to provide an alarm has several levels, the first being to warn the driver with a quick sound or chirp before a date stamp is recorded, the second being adapted to warn of an impending shut off of a portion of the motor's fuel injectors, and at least one other adapted to warn the driver of a total shut off of the motor and/or ignition.

18. A system as in claim 8 wherein said system also includes means to automatically slow down the vehicle if the transmitted data indicates it is in a restricted area.

19. A system as in claim 8 wherein said moderator includes means to shut down up to and including one half of the vehicle's engines fuel injectors.

20. A system as in claim 19 wherein said means to slow down the motor operation includes means to turn off the remaining fuel injectors.

21. The method of remotely controlling a driver's operation of a motor vehicle by use of a preprogrammed moderator mounted on said vehicle and connected to the control circuit and motor of said vehicle, said method comprising preprogramming said moderator with information relating to one or more of the following data groups, judicial information on the designated driver, to include age, license type, and entire violation record and court history parental information on the designated driver, to include parental inputs as to curfew times, maximum speeds at various times of the day and night, commercial information on the designated driver, to include type of license, experience with the particular vehicle type, past training on the vehicle and total number of hours spent on vehicle type, statistical information on the designated driver, to include age, gender, and length of driving time, providing an identification function to enable the designated driver to start and operate said motor vehicle, transmitting location and performance data on the vehicle as it is being driven, continuously downloading the data corresponding to the operation of said motor vehicle by the driver during the operation of said motor vehicle, and making any changes to said preprogramming necessitated by the previous driving record and/or providing alarms or shut down command to said driver and vehicle if the vehicle exceeds preset or location limits, whereby a designated driver's continued operation of a motor vehicle may be monitored over time and corrective operation parameters programmed as needed.

* * * * *